Patented Mar. 26, 1935

1,995,346

UNITED STATES PATENT OFFICE 1,995,346

ASPHALT EMULSION

Arthur Ludwick Halvorsen, Perth Amboy, N. J.

No Drawing. Application September 29, 1928,
Serial No. 309,360

14 Claims. (Cl. 134—1)

This invention relates to asphalt and similar emulsions and has for an object the provision of an improved asphalt emulsion and process of making the same.

The asphalt emulsions of commerce consist basically of mixtures of asphalt, water and various protective agents which serve to maintain, and in many cases also to effect, the emulsification. These emulsions may in general, be roughly classified into two groups possessing characteristically different properties: the first, comprising those emulsions in which substances other than colloidal clay serve as the protective agents, for example, certain soaps, alkalies, etc.; and the second those which utilize colloidal clay or other mineral colloids for such purpose.

In general, asphalt emulsions in the first category are more or less free-flowing, as distinguished from plastic in character, they tend to coalesce very readily upon drying, and are rather sensitive to various influences frequently encountered in general use, which tend to coagulate or "break" and otherwise adversely affect the emulsion. Their coalescent and non-plastic characteristics adapt these emulsions for use in certain applications, such as masonry, waterproofing, as "binders" in road-surfacing, and the like.

On the other hand, these same characteristics render this type of emulsion unsuitable in numerous applications, one example of which is in the provision of the thick coatings desired for the protection of metal structures, pipe lines, etc. When used in the form of thick coatings, their tendency to coalesce readily generally results in the rapid formation of a dried and coalesced film at the exposed surface, which entraps the unevaporated water therebeneath and results in poor adherence of the coating to the metal or other surface. Their tendency to slowly yield and flow, much in the manner of pure asphalt, presents a further limitation, in this and other applications, which becomes even more pronounced where the emulsion will be subjected to other than moderately low temperatures. An additional restricting factor, is the objectionable sensitivity of these emulsions, which prohibits their exposure to various adverse influences, such for example, as emulsion "breaking" electrolytes, acids, etc.

As regards the so-called clay emulsions, which are more of the order of suspensions than true emulsions, they are generally characterized by their non-coalescence, their plastic or flow-resistant nature and their relative non-sensitivity to the usual emulsion-breaking and similar injurious influences. These properties of the clay type of emulsions, render them much better adaptable than the non-clay type for use where thick protective coatings are desired and where admixture with or other exposure to materials or influences which are antagonistic to the non-clay type, is involved. However, while the non-coalescent character of this type of emulsion eliminates the matter of non-uniform drying associated with non-clay emulsions because of premature coalescence, it also inherently results in injury to the adhesive and cohesive strength of the coating. Because of this non-coalescence of the particles, the coating dries to a porous or cellular structure, and subsequent reabsorption of water upon exposure thereto, results in reduction in the degree of cohesion of the particles and adhesion to the coated surface. This objection is particularly pronounced when the emulsion is used as a protective coating for structures submerged in water.

In accordance with my invention, I have found that if a primary coalescent emulsion of the usual rapidly coalescing and sensitive type, and possessing an alkaline reaction, is prepared by the use of certain alkaline substances, and is subjected to treatment by feebly acidic substances of a certain nature, which eliminate the alkaline reaction in a carefully controlled manner as described hereinafter, changes are brought about in the primary emulsion of a nature difficult to determine or explain, which result in the production of a unique secondary emulsion. This emulsion possesses for example, the ability to coalesce in such a manner that practically uniform drying is readily secured even in thick coatings, it is plastic or flow-resistant in consistency, and, without dependence upon the use of clay, exhibits practically no tendency to "break" when subjected to the influence of the common electrolytes, acids or alkalies which ordinarily coagulate the non-clay emulsions of the prior art.

The following exemplary modes of procedure for producing such an emulsion, illustrate the general manner of carrying out my invention:

*I*

Using for example, Venezuelan asphalt having approximately the following characteristics:

Penetration at 77° F_____ 102
Loss on heating 50 grams, 5 hrs. 325° F__ 0.3%
Penetration at 77° F. of residue left after
  above heating_____ 88

*Sample evaporated to 53 penetration*

| | |
|---|---|
| Ductility at 77° F | 100 cms |
| Bitumen soluble in carbon disulphide | 99.92% |
| Bitumen soluble in ether | 85.5% |
| Penetration at 100° F | 242 |

A primary emulsion of alkaline reaction is first made by feeding 3500 lbs. of the asphalt, at about 110° C. into 1750 lbs. of water at 100° C., in which 25 lbs. of tri-sodium phosphate crystals have been dissolved, the addition of the asphalt being accompanied by thorough agitation. The amount of tri-sodium phosphate used should be very small, for, if used in material amounts, either inferior or non-emulsification of the asphalt will be obtained. In the above, for example, $Na_3PO_4$ constitutes approximately 0.2% of the total weight of the emulsion.

The alkaline emulsion obtained as above described, is then admixed at room temperature first with a dilute solution, e. g. 3.7%, of tannic acid in water, and subsequently with a dilute water solution, e. g. 4%, of $FeSO_4$, in such proportions that the tannic acid will be provided in the proportion of approximately 0.35%–0.40% of the total weight of the emulsion and the $FeSO_4$ approximately 0.11%.

The acid emulsion which results is of a plastic nature, is very stable, and possesses the ability to coalesce in such a manner as to permit practically uniform drying.

This stable marketable product may be further modified by the admixture of small amounts of ferric acetate, which at this stage may be added as full strength commercial iron acetate liquor without risk of "breaking" the emulsion. The purpose of the iron acetate is to give a further increased "body" to the emulsion but generally should not be used therefor in amounts materially in excess of 0.1% to 0.25% of the total weight of the emulsion, if the desired effect is to be obtained. If the combined proportion of iron sulphate and iron acetate substantially exceeds 0.5%, for example, a radically different effect is obtained wherein the plastic nature of the emulsion disappears and a rather mobile liquid emulsion results.

Instead of the iron acetate, the sulphate alone may be used in like manner to provide increased "body" to the emulsion.

II

The primary alkaline emulsion is formed by feeding 63.5% of the asphalt by weight at a temperature of about 120° C., into 36.5% water at 90°–100° C. in which the known "S" brand sodium silicate has been dissolved in sufficient amount to provide approximately equivalent to 0.19% $SiO_2$ and 0.05% $Na_2O$ in the emulsion. As in the case of the tri-sodium phosphate, the silicate, e. g. the well known "S" brand, should be used in the emulsion in amounts less than 1% combined total $SiO_2$ and $Na_2O$. Increase substantially beyond this limit will result in an inferior primary emulsion or in non-emulsification.

This primary alkaline emulsion is then admixed at room temperature with a 2% water solution of tannic acid, and thereafter a 5% water solution of $FeSO_4$ is added, the tannic acid and $FeSO_4$ being used in such proportions as to constitute 0.30% and 0.25% respectively of the weight of the emulsion, whereby the novel acid emulsion of my invention is obtained.

III

A primary alkaline emulsion is first prepared from 650 lbs. Venezuelan asphalt and 350 lbs. water in which 4½ lbs. of crystalline tri-sodium phosphate has been dissolved.

The secondary acid emulsion is then obtained by first admixing 400 parts by weight of the primary emulsion with 50 parts of a 3.5% water solution of tannic acid, and then adding thereto 30 parts of a 10% water solution of $Al_2(SO_4)_3.18H_2O$.

As in the previous cases the feebly alkaline tri-sodium phosphate and the feebly acidic tannic acid and aluminum sulphate should be used in relatively slight amounts, in this instance e. g. with reference to the total weight of the final emulsion, approximately 0.17% $Na_3PO_4$; 0.38% tannic acid, 0.14% $Al_2(SO_4)_3$.

The emulsion obtained thereby is of the same nature as that prepared in Case I, for example, but is somewhat less plastic than said emulsion.

IV

The primary alkaline emulsion may also be made by the use of a very small amount, e. g. 0.05%–0.10% of sodium hydroxide in conjunction with the asphalt and water which emulsion is thereafter treated with 2% tannic acid solution and 5% $FeSO_4$ solution to provide the novel emulsion of my invention. One representative set of proportions in which the constituents may be satisfactorily used, based on the total weight, is approximately as follows: Asphalt—50%; water—49.5%; $Na_2O$—0.08%, tannic acid 0.25%; $FeSO_4$, 0.20%.

The foregoing specific procedures are intended merely to be illustrative, and may be subjected to such changes as are necessitated by the particular operation involved, the character of the asphalt used, and other considerations which will be apparent to one skilled in the art. Other primary emulsifying agents which may be used in place of the tri-sodium phosphate, silicate, etc., for example, are the equivalent potassium compounds, and also sodium or potassium tannate, and other feebly acid substances which may be used, are pyrogallic acid as a substitute for the tannic acid, and lead acetate and copper sulphate for the ferrous sulphate.

In addition, inert fillers may be incorporated in the finished emulsion where such are desired, either in the form of non-colloidal non-swelling substances such as ordinary slate dust, or colloidal type fillers such as clay.

As noted hereinbefore, the primary coalescent emulsion is first prepared in an alkaline condition by the use of small amounts of certain alkaline substances, and this emulsion is then subjected to the action of small amounts of certain feebly acidic substances in a manner to produce a carefully controlled passage from the alkaline to an acid state.

The most suitable conditions of alkalinity and acidity may vary slightly in each particular instance, but in general are characterized as follows:

(1) The primary emulsion has a pH, determined colormetrically, of at least 9, and usually thereabove, e. g. 11 or 12.

(2) Upon the controlled treatment with the feebly acidic substance of a certain character, e. g. the tannic acid, the pH is lowered to substantially the neutral point, $pH^7$, and (3) thereafter, by the addition of the feebly acidic $FeSO_4$, the pH is carried to the acid side for the production of the final emulsion, to a point not lower than pH4 and generally between pH5 and pH6.

While proper pH control is an essential element in the production of the emulsion, the nature of the materials used is also of basic influence. The exact action of the tannic acid, FeSO4, Na3PO4, etc. is practically indeterminate and equally as difficult to explain theoretically.

One possible hypothesis is that concurrently with the change in the character of the emulsion which results in the plasticity and retarded coalescence, the use of these materials under the conditions noted, provides an adsorbed protective coating about the asphalt particles, which coating has become immunized, insofar as "breaking" of the emulsion is concerned, to the action of electrolytes, acids, alkalies and similar influences which commonly result in such an effect.

Regardless of the exact nature of the action which takes place, however, this insensitivity is produced and once the final emulsion has been obtained in the carefully controlled manner noted, it can be subjected to very rigorous treatment without breaking. For example, HCl can thereafter be added to the emulsion without breaking it, and similarly NaOH and NH4OH as well as Na2SO4, NaCl, MgCl2, CaCl2 and various other electrolytes.

I claim as my invention:

1. The process of making asphalt emulsion which comprises, preparing a primary asphalt-water emulsion of alkaline reaction through the medium of a small amount of non-pasty, non-swelling, alkaline-reacting alkali metal substance, and then subjecting said alkaline emulsion to the action of a small amount of feebly acidic substance to obtain a plastic, coalescent acid emulsion.

2. The process of making asphalt emulsion which comprises emulsifying asphalt in water containing an amount of alkali metal substance which will provide a pH of not less than 9, then subjecting the emulsion so obtained to the action of feebly acidic substance to obtain an emulsion having a pH of substantially 7, and then further increasing the hydrogen ion concentration of said emulsion to between pH7 and pH4 by the addition of a soluble salt of a strong acid and a weak base, whereby a plastic emulsion is obtained.

3. The process of making asphalt emulsion which comprises dispersing molten asphalt in hot water in the presence of a small amount of non-pasty, non-swelling, alkaline-reacting alkali metal substances to provide an emulsion having a pH of not substantially less than 9, then subjecting said emulsion to the action of a small amount of feebly acidic substance whereby the hydrogen ion concentration is changed to between pH7 and pH4 and a plastic acid emulsion is obtained.

4. The process of making asphalt emulsion which comprises dispersing asphalt in water in the presence of a small amount of tri-sodium phosphate to obtain an emulsion having a hydrogen ion concentration corresponding to a pH reading of not less than 9, subjecting said emulsion to the action of tannic acid to obtain an emulsion having a hydrogen ion concentration of substantially pH7, and subjecting said last named emulsion to the action of acid reacting electrolyte to produce a plastic emulsion having a hydrogen ion concentration between pH7 and pH4.

5. The process of making asphalt emulsion which comprises, dispersing asphalt in water containing a small amount of a substance having an alkali metal cation and an anion of the group: silicate, tribasic phosphate, hydroxyl, tannate, to obtain an emulsion having a hydrogen ion concentration corresponding to a pH reading of not less than 9, subjecting the alkaline emulsion so obtained to the action of an acid phenolic substance of the nature of tannic acid, pyrogallic acid to obtain an emulsion having a hydrogen ion concentration of substantially pH7, and subjecting said last named emulsion to the action of an electrolyte of the group: ferrous sulphate, iron acetate, copper sulphate, lead acetate, aluminum sulphate to obtain a plastic emulsion having a hydrogen ion concentration between pH7 and pH4.

6. The process of making asphalt emulsion which comprises dispersing asphalt in water containing an alkali metal substance in amount sufficient to produce an emulsion having a pH of not less than substantially 9, subjecting said emulsion to the action of a small amount of tannic acid to obtain an emulsion having a pH of substantially 7, and subjecting said last named emulsion to the action of ferrous sulphate to obtain a plastic emulsion having a pH between 7 and 4.

7. The process of making asphalt emulsion which comprises dispersing asphalt in water containing a substance having an alkali metal cation and an anion of the group: silicate, tribasic phosphate, hydrate in amount constituting approximately 0.04%–1% of the weight of the batch, whereby an alkaline emulsion is obtained, and then converting said alkaline emulsion to an acid emulsion by subjecting it first to the action of tannic acid and then to the action of ferrous sulphate, in amounts respectively constituting approximately 0.24%–0.40%, and 0.10%–0.26% of the weight of the emulsion.

8. The process of making asphalt emulsion which comprises, emulsifying asphalt in water through the medium of a small amount of alkali metal substance to provide an alkaline emulsion, subjecting the alkaline emulsion so obtained to the action of a small amount of tannic acid to obtain a substantially neutral emulsion, and then subjecting said emulsion to the action of a soluble salt of a strong acid and a weak base the cation of which has at least a valence of two, whereby a plastic acid emulsion is obtained.

9. The process of making asphalt emulsion which comprises, emulsifying asphalt in water through the medium of a small amount of alkali metal salt providing an emulsion having a hydrogen ion concentration corresponding to a pH reading of not less than 9, subjecting said emulsion to the action of an acid phenolic substance of the order of tannic acid in amount sufficient to change the hydrogen ion concentration of said emulsion to pH7 and then subjecting said emulsion to the action of an electrolyte of acid reaction the cation of which has a valence not less than two, in amount sufficient to provide a plastic emulsion having a hydrogen ion concentration between pH7 and pH4.

10. A new article of manufacture which comprises a plastic, stable, homogeneously coalescent emulsion constituted from asphalt, water, a non-pasty, non-swelling alkali-reacting alkali metal substance, tannic acid and metal salts, and having a hydrogen ion concentration between pH7 and pH4.

11. The process of making asphalt emulsion which comprises dispersing asphalt in water in the presence of a small amount of alkali metal silicate whereby an alkaline emulsion is obtained, subjecting said alkaline emulsion to the action of a small amount of tannic acid to obtain an emulsion having a hydrogen ion concentration of substantially pH⁷, and then subjecting the emulsion so obtained to the action of a soluble salt of a strong acid and a weak base to obtain a plastic emulsion having a hydrogen ion concentration between pH⁷ and pH⁴.

12. The process of making asphalt emulsion which comprises dispersing asphalt in water containing a small amount of alkali metal hydrate whereby an alkaline emulsion is obtained, subjecting said emulsion to the action of a small amount of tannic acid to neutralize the alkalinity, and subjecting the emulsion so obtained to the action of a soluble salt of a strong acid and a weak base to obtain a plastic acid emulsion having a hydrogen ion concentration between pH⁷ and pH⁴.

13. The process of making asphalt emulsion which comprises preparing a primary asphalt water emulsion of alkaline reaction, through the medium of a small amount of non-pasty, non-swelling, alkaline-reacting alkali metal substance, and then subjecting said alkaline emulsion, in the presence of a salt of a weak acid with an alkali metal, to the action of a small amount of acidic substance to obtain a stable, plastic, homogeneously coalescent, acid emulsion.

14. A new article of manufacture which comprises a plastic, stable, homogeneously coalescent emulsion exhibiting substantially no tendency to break when subjected to the influence of acidic or alkaline electrolytes, and composed of asphalt, water, a non-pasty, non-swelling, alkaline-reacting alkali metal substance, and a non-pasty, non-swelling, acid-reacting acidic substance, and having a hydrogen ion concentration of between pH⁷ and pH⁴.

ARTHUR LUDWICK HALVORSEN.